United States Patent
Singhvi

[11] Patent Number: 5,238,580
[45] Date of Patent: Aug. 24, 1993

[54] METHOD FOR TREATING LANDFILL LEACHATE

[75] Inventor: Sanjay S. Singhvi, Iowa City, Iowa

[73] Assignee: Green Environmental Services, Inc., Cedar Rapids, Iowa

[21] Appl. No.: 947,789

[22] Filed: Sep. 18, 1992

[51] Int. Cl.[5] .................. C02F 1/20; C02F 1/66; C02F 1/62

[52] U.S. Cl. .................. 210/718; 210/724; 210/737; 210/747; 210/750; 210/912; 405/128; 405/129

[58] Field of Search ............. 405/128, 129; 210/718, 210/724, 747, 750, 737, 912; 55/70, 73

[56] References Cited

U.S. PATENT DOCUMENTS

| | | | |
|---|---|---|---|
| 4,008,162 | 2/1977 | Korenowski et al. | 204/149 |
| 4,017,388 | 4/1977 | Albertson | 210/713 |
| 4,093,544 | 6/1978 | Ross | 210/180 |
| 4,283,373 | 8/1981 | Frech et al. | 423/226 |
| 4,323,367 | 4/1982 | Ghosh | 210/926 |
| 4,396,402 | 8/1983 | Ghosh | 210/926 |
| 4,412,509 | 11/1983 | Black | 122/17 |
| 4,419,968 | 12/1983 | Lee | 423/230 |
| 4,472,363 | 9/1984 | Poller et al. | 423/240 |
| 4,518,399 | 5/1985 | Croskell et al. | 55/16 |
| 4,643,111 | 2/1987 | Jones | 210/901 |
| 4,657,680 | 4/1987 | Zibrida | 210/713 |
| 4,665,597 | 8/1984 | Herman et al. | 210/713 |
| 4,689,156 | 8/1987 | Zibrida | 210/747 |
| 4,838,733 | 6/1989 | Katz | 210/901 |
| 4,849,191 | 7/1989 | Brooks | 423/231 |
| 5,022,786 | 6/1991 | Philo | 405/128 |
| 5,032,289 | 7/1991 | Martineau | 210/747 |
| 5,116,515 | 5/1992 | Selesnick | 210/744 |
| 5,122,165 | 6/1992 | Wang et al. | 55/38 |
| 5,126,050 | 6/1992 | Irvine et al. | 210/631 |
| 5,139,365 | 8/1992 | Chesner | 210/751 |

Primary Examiner—Stanley S. Silverman
Assistant Examiner—Neil M. McCarthy
Attorney, Agent, or Firm—Simmons, Perrine, Albright & Ellwood

[57] ABSTRACT

An improved method for treating leachate from a sanitary landfill is provided. The method includes the steps of adding a pH adjuster to elevate the pH of the leachate, such that ammonia nitrogen compounds, COD compounds, and VOCs form volatiles and heavy metals form insoluble compounds; combusting landfill gas to produce combustion products and to elevate the temperature of the leachate such that chemical activity is enhanced therein; gas stripping the volatiles from the leachate; precipitating the insoluble compounds from the leachate; and diffusing the combustion gases through the leachate to reduce the pH thereof to an acceptable discharge level.

16 Claims, 1 Drawing Sheet

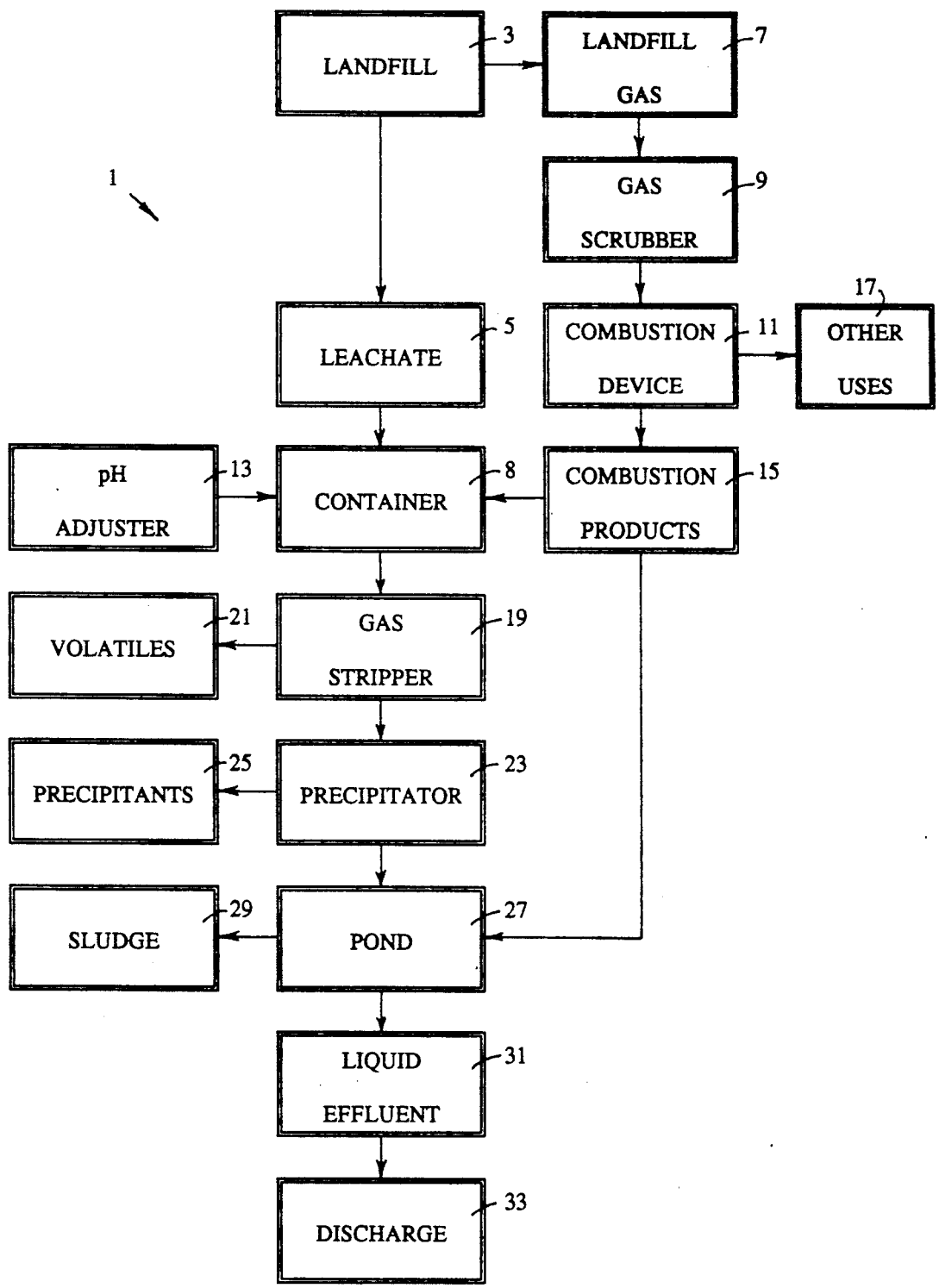

METHOD FOR TREATING LANDFILL LEACHATE

BACKGROUND OF THE INVENTION

1. Field of the Invention

This invention relates to a method for treating leachate from a sanitary landfill in order to remove contaminating constituents therefrom.

2. Description of the Related Art

Sanitary landfills contain a wide variety of wastes including organic wastes, some of which undergo anaerobic decomposition of organic material or garbage decay. When liquids such as rain water and ground water come in contact with these wastes, leachate is formed. Leachate generally contains high concentrations of various contaminants, including ammonia nitrogen compounds ("$NH_3$—N"), Chemical Oxygen Demand ("COD"), volatile organic compounds ("VOCs") and, possibly, heavy metals. Of these contaminants, disposal of untreated leachate having a high concentration of $NH_3$—N may present a serious problem due to its toxicity to fish populations. As a result, state and federal landfill regulations now contain stringent standards for collecting and treating leachate. Unfortunately, leachate is difficult to treat.

Basically, four technologies exist for the removal of the $NH_3$—N from leachate: ion exchange, breakpoint chlorination, biological removal and stripping towers. Unfortunately, each of these technologies has certain disadvantages. For example, ion exchange involves both substantial capital and operational costs due to both pre-treatment and removal equipment requirements. Although breakpoint chlorination requires minimal initial capital costs, this technology involves high operational costs, with the end products thereof often presenting discharge problems of its own.

Biological removal, which is predominantly used at present for removal of $NH_3$—N, requires both high capital and operational costs. In addition, this technology is sensitive to temperature, pH, and toxic metal concentrations, each of which randomly varies over a wide range in leachate obtained from landfills.

Stripping towers would appear to be particularly adaptable for removal of $NH_3$—N from landfill leachate as this method is capable of removing high concentrations of such compounds at the generally low flow-volumes of leachate. One of the aspects of stripping tower technology is to raise the pH of the leachate by adding an alkali, which largely converts ammonium ions, $NH_4^+$, to ammonia gas, $NH_3$. The ammonia gas can then easily be stripped from the liquid leachate by diffusing air or another gas therethrough. This technology, however, has two major drawbacks: loss of efficiency during cold weather, and scaling caused by the addition of the alkali.

A landfill owner generally has three available options for treating leachate: (1) provide adequate on-site treatment of the leachate which meets the stringent government agency standards and directly discharge the treated leachate to surface waters; (2) provide proper pre-treatment of the leachate prior to discharge thereof into an off site wastewater treatment facility; or (3) discharge untreated leachate directly into an off site wastewater treatment facility which is capable of processing the untreated leachate. Conventional technologies used to treat high concentrations of $NH_3$—N and COD commonly include biological treatment plants, such as sequencing batch reactors or other aerobic biological processes in order to provide nitrification and COD reduction. Many of the publicly owned treatment facilities of smaller communities do not have the capability to provide the off site treatment facilities generally required for treating leachate.

It is known that an increase in temperature generally causes a corresponding increase in chemical activity. As a result, the rate of chemical processes utilized to remove contamination constituents from leachate can be enhanced by increasing the temperature of the leachate. Such an increase in temperature can be obtained by a variety of methods, including heating the leachate by combusting natural gas, which provides thermal energy of approximately 1,030 B.T.U./ft$^3$. At most landfills, however, natural gas is not generally available, nor a free resource.

As an alternative, sanitary landfills which produce leachate also generally produce landfill gas, a substantial percentage of which is comprised of methane, an excellent low-cost heating source. Although the thermal energy available from landfill gas (approximately 400–600 B.T.U./ft.$^3$) is only about one-half of the thermal energy available from natural gas, the landfill gas is a free, and otherwise wasted, resource. Combustion of methane produces two important combustion products: (1) thermal energy, which can be used for heating purposes, and (2) carbon dioxide, which can be used to produce carbonic acid.

What is needed is a cost-effective method for treating leachate from a landfill, which utilizes the combustion products from a natural or landfill gas to not only accelerate the treatment process but also to reduce the pH of the treated leachate to a level whereby the leachate can be discharged directly into the environment.

SUMMARY OF THE INVENTION

An improved method is provided for treating leachate from a sanitary landfill which produces landfill gas containing methane. The method includes scrubbing the landfill gas to remove impurities therefrom, and combusting the scrubbed landfill gas to produce thermal energy and combustion gases.

The pH of the leachate is elevated to convert ammonium ions in ammonia nitrogen compounds to ammonia gas. The increase in pH also causes heavy metals contained in the leachate to be converted to insoluble compounds. The temperature of the leachate is elevated by using the thermal energy from the combustion process. Then, the ammonia gas and other volatile contaminants are stripped from the leachate using air and/or combustion gases. After stripping, the insoluble compounds and suspended solids are allowed to settle and precipitate from the leachate. The pH of the leachate is then reduced to allowable discharge levels by diffusing the combustion gases through the leachate.

OBJECTS AND ADVANTAGES OF THE INVENTION

Therefore, the principle objects and advantages of the present invention include: providing a method of treating leachate of a sanitary landfill wherein thermal energy from combusting landfill gas from the landfill is used to elevate the temperature of the leachate; providing such a method whereby ammonia-nitrogen compounds, VOCs, and other volatile contaminants are removed from the leachate by gas stripping; providing such a method whereby insoluble heavy metal compounds and suspended solids are precipitated and settled from the leachate; providing such a method whereby combustion gases from combusting landfill gas is used to reduce the pH of leachate, after treating, to acceptable discharge levels; and generally providing such a method which is efficient and reliable, cost-effective, and generally meets the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

The FIGURE is a schematic diagram of a method for treating leachate, in accordance with the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific process and functional details disclosed herein are not to be interpreted as limiting, but merely as a basis for the claims and as a representative basis for teaching one skilled in the art to variously employ the present invention in virtually any appropriately detailed process.

The reference numeral 1 generally refers to a method for treating leachate in accordance with the present invention, as schematically shown the FIGURE. The method 1 is generally concerned with a landfill 3 which produces leachate 5 and landfill gas 7. The leachate 5 is removed from the landfill 3, such as by pumping or draining the leachate 5 from a passive trench, extraction well, or other suitable means, and conveyed to a container 8. Initially, the leachate 5 after removal from the landfill 3 contains various types of contaminants, such as ammonia-nitrogen compounds (hereinafter sometimes referred to as "$NH_3-N$"), Chemical Oxygen Demand ("CODs"), volatile organic compounds ("VOCs"), possibly heavy metals, and other contaminants, the discharge of which are regulated or prohibited by various federal, state and local agencies. Before processing the leachate 5 as hereinafter described, the pH of the leachate 5 is measured and, if necessary, a pH adjuster 13, such as caustic, $Ca(OH)_2$, or other suitable substance, is added to adjust the pH of the leachate 5 to a range of 8.5-12.0, preferably 10.5-11. Elevating the pH of the leachate 5 alters the chemical composition thereof such that ammonium ions in the leachate 5 are substantially converted to gaseous ammonia which can generally be readily stripped from the leachate 5 as hereinafter described. In addition, heavy metals present in the leachate 5 may more readily form insoluble compounds which generally tend to settle out of the leachate 5.

At the various steps of the method 1 as herein described, the composition of the leachate 5 may be changed due to the addition, removal, or modification of one or more of the constituents thereof from that which existed when the leachate 5 was removed from the landfill 3. In order to simplify discussion of the method 1, the remaining composition of the substance being treated will be referred to as the leachate 5.

Also, the landfill gas 7 is removed from the landfill 3 by pumping, vacuum extraction, or other suitable means, from active wells or the like. The landfill gas 7 is generally substantially comprised of methane and carbon dioxide, but may also contain other impurities such as hydrogen sulfide, etc. Some of these impurities must generally be removed from the landfill gas 7 before the landfill gas 7 can be combusted as hereinafter described.

The impurities of the landfill gas 7 are generally removed by passing the landfill gas 7 through a gas scrubber 9. The gas scrubber 9 may comprise one or more commercially available filters, such as an iron filings filter which removes hydrogen sulfide from the landfill gas 7. If the landfill gas 7 contains other impurities which may also need to be removed prior to combustion, the gas scrubber 9 may also include a chemical or alkali scrubber, such as sodium hydroxide, for removing those additional impurities from the landfill gas 7. Such gas scrubbing techniques are well known in the art.

The landfill gas 7, subsequent to passage through the gas scrubber 9, is then directed to a combustion device or engine 11 which is adapted to convert the landfill gas 7 to combustion products 15, including thermal energy and combustion gases, the latter generally being predominantly comprised of carbon dioxide and water. The combustion device 11 may be an internal combustion engine, a boiler having a heat exchanger adapted to circulate a heated medium through the leachate 5, a burner designed to heat the container 8 containing the leachate 5, or combinations of one or more of these, or other similar arrangement. If the device 11 is an internal combustion engine, mechanical energy therefrom as a byproduct from combusting the landfill gas 7 may also be available for other uses 17.

If the present method 1 is being operated as a continuous process, as opposed to a batch process, the temperature of the leachate 5 may be controlled by coordinating the residence time of the leachate 5 in the container 8 containing the leachate 5 wherein thermal energy is being transferred to the leachate 5.

The leachate 5 is heated by the combustion products 15 such that the leachate 5 is elevated to a temperature in the range of 50° C. to 95° C., preferably 70° C. to 90° C. At the elevated temperature, the solubilities of $NH_3-N$ and VOCs are greatly reduced, thereby allowing more efficient removal of the volatile contaminants.

After elevating the temperature and the pH of the leachate 5 as hereinbefore described, the leachate 5 is subjected to a gas stripper 19, using air or other suitable gaseous substance, to remove various contaminating volatiles 21 contained in the leachate 5, the volatiles 21 generally including $NH_3-N$, VOCs, and the like. The gas stripper 19 may be of the diffused-air type, spray pond, stripping tower, or other suitable arrangement, each commonly known in the art. The volatiles 21 removed from the leachate 5 by the stripper 19 may be burned in an afterburner (not shown) or discharged directly into the atmosphere, if permissible. The temperature of the leachate 5 in the stripper 19 may be maintained at a relatively stable temperature during the stripping process or, alternatively, the stripping treatment may be continued, particularly for batch processing, until the temperature of the leachate 5 is reduced to a lower temperature, such as 25° C. or other suitable temperature.

After removal of the volatiles 21, the leachate 5 may optionally be directed to a precipitator 23 whereby various precipitants 25, such as heavy metals which have formed insoluble hydroxides in the elevated pH environment of the leachate 5, are permitted to precipitate or settle from the leachate 5. Removal of approximately 95% of heavy metals by the method 1 have been observed. In addition, other suspended solids may tend to settle out of the leachate 5 in the precipitator 23 by providing quiescent conditions commonly known in the art. If desired, precipitation of the heavy metal products may be accelerated by further adjustment of the pH of the leachate 5 in the precipitator 23.

Next, the leachate 5 is routed to a settling basin or pond 27 whereat the leachate 5 is subjected to atmospheric cooling and whereat the slower settling precipitants 25 may settle to the bottom thereof to form a sludge 29. The leachate is generally retained in the pond 27 for three to seven days, or as otherwise required by the regulating authorities.

After sufficient cooling and settling has occurred in the pond 27 combustion gases of the combustion products 15 of the landfill gas 7 are directed into the leachate 5. These combustion gases 15 are diffused through the pond 27 to form carbonic acid as needed to reduce the pH of the leachate 5 in a liquid effluent 31 thereof to below a level allowable for discharge into a stream, such as below 9.0 pH. The diffusion of the combustion gases 15 through the leachate 5 forms carbonic acid which lowers the pH of the leachate 5 to allowable discharge levels. Alternately or additionally, acids or other neutralizing agents may be added to the liquid effluent 31 to adjust the pH of the leachate 5 prior to the discharge 33.

EXAMPLE 1

A 1-liter, low viscosity sample of the leachate 5 taken from a sanitary landfill 3 had the following initial characteristics:

| pH | 7.73 |
| --- | --- |
| $NH_3$-N | 125 mg/l |
| COD | 1813 mg/l |

The pH of the leachate 5 was raised to 12.87 by using sodium hydroxide for the pH adjuster 13 and the temperature of the leachate 5 was elevated to approximately 82° C. Then, the leachate 5 was subjected to the gas stripper 19 for approximately 15 minutes, using air as the stripping agent, whereat the $NH_3$—N concentration was reduced to 3.8 mg/l (a reduction of over 96%), and the COD concentration was reduced to 600 mg/l (a reduction of over 66%).

EXAMPLE 2

A 1-liter, low viscosity sample of the leachate 5 taken from a sanitary landfill 3 had the following initial characteristics:

| pH | 7.39 |
| --- | --- |
| $NH_3$-N | 205 mg/l |
| COD | 1653 mg/l |

The pH of the leachate 5 was raised to 12.92 by using sodium hydroxide for the pH adjuster 13 and the temperature of the leachate 5 was elevated to approximately 82° C. Then, the leachate 5 was subjected to the gas stripper 19 for approximately 15 minutes, using air as the stripping agent, whereat the $NH_3$—N concentration was reduced to 6.0 mg/l (a reduction of over 97%) and the COD concentration was reduced to 580 mg/l (a reduction of over 64%).

EXAMPLE 3

A 1-liter, high viscosity sample taken from a sanitary landfill 3 had the following initial characteristics:

| pH | 6.67 |
| --- | --- |
| $NH_3$-N | 650 mg/l |
| COD | 5560 mg/l |

The pH of the leachate 5 was raised to 12.9 by using sodium hydroxide for the pH adjuster 13 and the temperature of the leachate 5 was elevated to approximately 82° C. Then, the leachate 5 was subjected to the gas stripper 19 for approximately 15 minutes, using air as the stripping agent, whereat the $NH_3$—N concentration was reduced to 18.0 mg/l (a reduction of over 97%) and the COD concentration was reduced to 3680 mg/l (a reduction of over 33%).

It is to be understood that the present invention may be utilized either as a batch process or a continuous process. For small quantities, the investment to provide the necessary equipment for continuous processing may not be justifiable. However, if the quantity of leachate 5 requiring processing should exceed approximately 2-3 gallons per minutes, then it may be advisable to structure the present invention as a continuous process.

The apparatus for performing the method 1 may have modular, relatively portable construction which can be designed to process various quantities of the leachate 5 on-site, require minimal set-up time and minimal operator attention, and can generally be constructed and operated more cost effectively than conventional leachate treatment systems. Although the method 1 could be used with a variety of heating 10 sources, use of the combustion products 15 provided by combusting the landfill gas 7 contributes to the economy 12 provided by the method 1. Even though the sanitary landfill 3 generally may not produce large quantities of the landfill gas 7, only a few cubic feet per minute of the landfill gas 7 is generally required to provide the necessary thermal energy and the combustion gases 15 needed to treat the leachate 5 from the landfill 3 servicing a small community.

It is to be understood that while certain forms of the present invention have been illustrated and described herein, it is not to be limited to the specific forms or arrangement of parts described and shown.

What is claimed and desired to be secured by Letters Patent is as follows:

1. A method for removing contaminants from leachate of a landfill which produces landfill gas, comprising the steps of:
    (a) combusting the landfill gas to produce combustion products;
    (b) heating the leachate with said combustion products;
    (c) removing contaminants from the leachate by gas stripping; and (d) reducing the pH of the leachate with said combustion products.

2. The method according to claim 1, wherein step (c) is preceded by:
   (a) adding a pH adjuster to the leachate to raise the pH of the leachate.

3. The method according to claim 2, wherein said pH adjuster is an alkali.

4. The method according to claim 2, wherein said pH adjuster is calcium hydroxide.

5. The method according to claim 2, including the step of:
   (a) precipitating heavy metal contaminants from the leachate.

6. The method according to claim 5, wherein said step of precipitating heavy metal contaminants follows step (c) and precedes step (d) of claim 1.

7. The method according to claim 2 wherein the pH is raised to between 8.5 and 12.0.

8. The method according to claim 2 wherein the pH is raised to between 10.5 and 11.0.

9. The method according to claim 1 wherein step (b) includes raising the temperature of the leachate to between 50° C. and 95° C.

10. The method according to claim 1 wherein step (b) includes raising the temperature of the leachate to between 70° C. and 90° C.

11. The method according to claim 1, wherein step (a) is preceded by:
    (a) scrubbing the landfill gas.

12. The method according to claim 11, including:
    (a) passing the landfill gas through an iron filing filter.

13. The method according to claim 12, including:
    (a) passing the landfill gas through an alkali scrubber.

14. The method according to claim 11, including:
    (a) passing the landfill gas through an alkali scrubber.

15. The method according to claim 1, wherein step (c) is followed by:
    (a) placing the leachate in a pond.

16. A method for removing contaminants from leachate of a landfill which produces landfill gas, comprising the steps of:
    (a) elevating the pH of the leachate;
    (b) scrubbing the landfill gas and combusting said scrubbed gas to produce thermal energy and combustion gases;
    (c) heating the leachate with said thermal energy;
    (d) subjecting the leachate to gas stripping to remove volatile contaminants from the leachate;
    (e) precipitating non-volatile contaminants from the leachate; and
    (f) reducing the pH of the leachate by diffusing said combustion gases through the leachate.

* * * * *

UNITED STATES PATENT AND TRADEMARK OFFICE
CERTIFICATE OF CORRECTION

PATENT NO.   :   5,238,580

DATED        :   August 24, 1993

INVENTOR(S)  :   Sanjay S. Singhvi

It is certified that error appears in the above-identified patent and that said Letters Patent is hereby corrected as shown below:

In column 6, line 44:  after "heating", delete "10"; and
line 46:  after "economy", delete "12".

Signed and Sealed this

Twenty-second Day of March, 1994

Attest:

BRUCE LEHMAN

*Attesting Officer*      *Commissioner of Patents and Trademarks*